United States Patent
St.Lawrence

(10) Patent No.: US 7,972,768 B1
(45) Date of Patent: Jul. 5, 2011

(54) WET COMBUSTION ENGINE

(76) Inventor: Thomas W. St.Lawrence, Lake Jackson, TX (US)

( * ) Notice: Subject to any disclaimer, the term of this patent is extended or adjusted under 35 U.S.C. 154(b) by 1089 days.

(21) Appl. No.: 11/801,695

(22) Filed: May 11, 2007

Related U.S. Application Data

(62) Division of application No. 10/230,685, filed on Aug. 30, 2002, now Pat. No. 7,241,615.

(51) Int. Cl.
*C12Q 3/00* (2006.01)
*C12M 1/12* (2006.01)
*C05F 9/02* (2006.01)

(52) U.S. Cl. ...... 435/3; 435/262; 435/290.4; 435/297.1; 435/297.2; 210/610

(58) Field of Classification Search ............... 435/290.4, 435/297.1, 297.2, 292.1, 3, 262; 210/610
See application file for complete search history.

(56) References Cited

U.S. PATENT DOCUMENTS

| | | | |
|---|---|---|---|
| 5,346,826 A | 9/1994 | Andrews | 435/400 |
| 5,551,987 A | 9/1996 | D'Addavio et al | |
| 5,585,266 A | 12/1996 | Plitt et al. | |
| 5,705,390 A | 1/1998 | Kadouri | |
| 5,725,770 A | 3/1998 | Henry | |
| 5,833,857 A | 11/1998 | Roth | |
| 5,928,514 A | 7/1999 | Gothreax | |
| 6,245,237 B1 | 6/2001 | Blough et al. | |
| 6,268,204 B1 | 7/2001 | Miller et al. | |
| 6,335,191 B1 | 1/2002 | Kiplinger et al. | |
| 6,402,941 B1 | 6/2002 | Lucido et al. | |

OTHER PUBLICATIONS

Carnegie Mellon—Control Tutorials for Matlab—PID Tutorial printed Jul. 23, 2002 http://www.engin.umich.edu/group/ctm/PID/PID.html.

Wastewater Engineering, Fourth Edition, Metcalf & Eddy McGraw-Hill, Copyright 2003, p. 564,566-567, and 574.
Sewage Aeration Systems brochure, Hoage & Messer Lockridge, IA 52635.
Water and Its Impurities, Thomas R. Camp Reinhold Publishing Corporation, Copyright 1963, p. 219-220.
Space Alliance Technology Outreach Program (SATOP) brochure vol. 1, Issue 1 Premier Jan.-Mar. 2002.

*Primary Examiner* — William H Beisner
(74) *Attorney, Agent, or Firm* — Peter F. Casella

(57) ABSTRACT

This invention relates to systems, apparatus and methods of operating a wet combustion engine and apparatus therefore, capable of biologically burning fuels within a wet combustion chamber within a bioproactor system, including but not limited to, organic carbon containing materials especially biological, hazardous or toxic waste contaminants, in an environmentally sensitive manner. An integrated computer control system that, proactively and pre-emptively, uses feedback from bio-sensors, to monitor, record and control applicable components of the bio-system, to optimize, replenish, and sustain exponential growth of selected life-forms, including but not limited to microbes such as bacteria. In the intake cycle, a suitably prepared fuel mixture is metered into the wet combustion diffusion separation membrane chamber located within the life-support chamber of the bioproactor. In the combustion cycle, diffusion and combustion rates are monitored and timed. In the exhaust cycle, products of combustion, including water and incomplete combustion by-products both organic and inorganic, are removed. The above cycles may be repeated sequentially. The subsequent accumulation of all of the exhaust cycle's products of combustion may be collected, stored, classified, separated, recycled or discharged. Some of the potential energy released during the combustion cycle's reaction directly results in the conversion of wastes, the generation of gases and, in the case of organic carbon fuels, the generation of water. Other uses of the kinetic and potential energy released by this engine include, but are not limited to the, mechanical movements of actuators, and heat transfer to heat exchangers.

14 Claims, 3 Drawing Sheets

FIGURE 1    FUEL CONVERSION

Raw Waste to *Microbial Food Equivalent (MFE)... (conditioned Fuel)*

Cross section through a Wet Combustion Engine

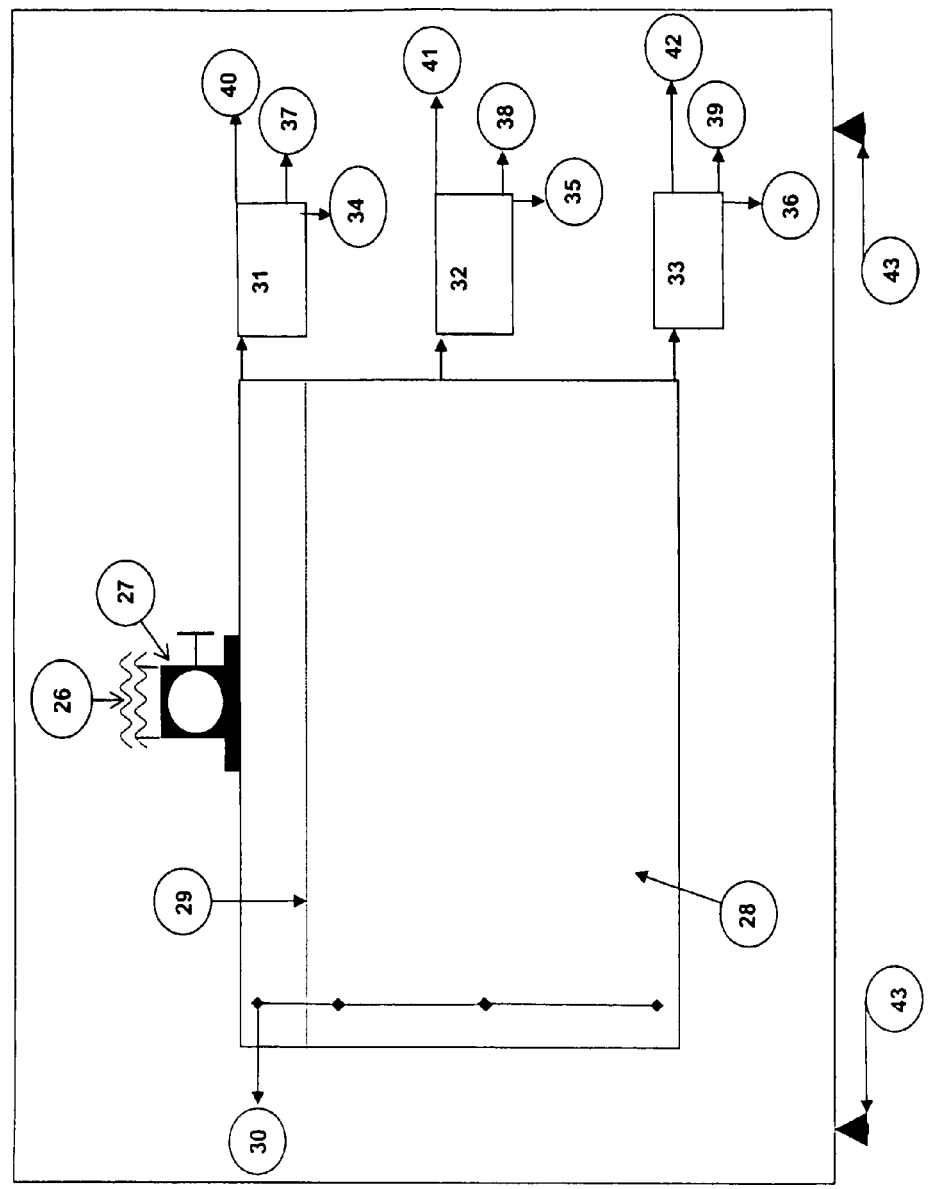
FIGURE 3  Combustion Exhaust Holding Tank

WET COMBUSTION ENGINE

This application is a Division of application Ser. No. 10/230,685 filed Aug. 30, 2002, now U.S. Pat. No. 7,241,615. The parent application Ser. No. 10/237,685 filed Aug. 30, 2002 is hereby incorporated herein by reference.

FIELD OF THE INVENTION

The present invention relates to a system, method, and apparatus for the purification of waste, most commonly, by biological purification. Specifically, this invention relates to the preparation and refinement of waste to a microbial food equivalent (MFE). Said food is cycled through a wet combustion chamber diffusion separation membrane contained within an advanced proactive bioreactor called a bioproactor. The wet combustion engine thereby configured produces the biological conversion of said MFE to exhaust, while proactively monitoring and pre-emptively adjusting the living environment of continuously maintained exponential growth phase microbes.

BACKGROUND OF THE INVENTION

The invention may be applied to a broad range of applications. For clarity and illustration, an example of biological metabolism of organic carbon waste using oxygen is described in detail below. Although this example is the more common, other less common applications, such as thermophilic bacteria using hydrogen sulfide to chemically and symbiotically "fix" or process organics, are also to be included. This invention uses the assimilation and reproductive mechanism of living organisms, in combination with any of their dependent environmental requirements, as an engine that produces the beneficial conversion of undesirables to desirables. The living organism may be prokaryotes, eukaryotes or a combination thereof. Together, the growth, metabolic and environmental requirements determine the spectrum of conditions required to sustain life. For example, it was only recently discovered that a diversity of life (dependent on microbes—i.e. specific bacteria) abounds in very high temperature, high pressure, nutrient-rich, volcanic vents, thousands of feet undersea. This invention introduces the concept of a bioproactor which, by definition, is an advanced bioreactor. The standard uses of a bioreactor will provide the basis from which this bioproactor evolves.

There is often a rapid uncontrolled decline in the viability of an exponential growth phase bacterial reaction when bioreactor cultures are delivered to a waste stream. Too often the bacteria fail to survive; consequently, there is a rapid diminish in function and number. Factors, likes toxic shock, water quality or hostile conditions in the field, all contribute to undesirable failure. Likewise, a waste stream delivered to a bioreactor is also difficult to control. Typically waste is inconsistent, incompatible and toxic to the system. In addition, by-products of the reaction accumulate and the exponential growth phase stops.

This invention introduces a novel approach to the above problems. A new system, containing a wet combustion engine solves these problems. Based on advanced support technologies, the wet combustion engine, deploying pre-emptive, proactive control, is described as a bioproactor. Details and definitions follow that describe how waste is converted to fuel; then burned in a wet combustion chamber. The three cycles of intake, combustion, and exhaust are repeated as necessary. Surplus recycled exhaust is separated into undesirable and desirable streams. Regenerative recycled desirables are stored or returned to the process as needed. The bioproactor concurrently generates, delivers, sustains, and replenishes microbial exponential growth while removing undesirable by-products without compromising their environment.

This invention was made possible by recent advances in a number of areas. First, advanced aeration technology, in particular vacuum Bubble™ aeration, maintains high oxygen delivery potential to the bioproactor. Second, advanced bio-generation has the ability to deliver highly-concentrated, exponential growth phase bacteria as required. Third, a synergy is created in combining the bioproactor's pre-emptive life-support capabilities with computer control using PID algorithms. Fourth, biosensor feedback administers interactive management of high bacterial growth rates and their accompanying demands. The diversity and advancements in membrane technology have contributed to the practical implementation of the wet combustion engine concept and thereby allowed the bioproactor concept to become a reality.

For convenience and clarity, water and bacteria are herein referred to as the liquid and microbe of choice, respectively. It is within the scope of this invention that other liquids, capable of supporting living organisms, as well as other life-forms be included. For example, higher-order multi-celled organisms such a zoo-plankton, capable of oxidation/reduction, as well as other electron donors and acceptors (e.g. in place of oxygen such as sulfur or nitrogen) are also to be included as wet combustion engine components.

The following definitions will aid in the understanding of the advanced capabilities of the bioproactor with the proactive, pre-emptive ability in support of the wet combustion engine system.

1. biological burning
2. PID
3. bioreactor
4. proactive
5. recycle process, (RP)
6. regenerative recycle process (RRP)
7. proportional regenerative recycle process, at times referred to as (PRRP)
8. bioproactor
9. minomax
10. exponential growth phase bacteria, at times referred to as (EGB)
11. life-support
12. bio-generation
13. advanced aeration
14. microbial food equivalent, at times referred to as (MFE)
15. PLC and integrated computer systems
16. gas, liquid and solid/liquids, at times referred to as (G,L, S/L)
17. discard, removal or elimination 1 biological burning Refers to the process, within a liquid such as water, of the oxidation-reduction of molecules by microbes. It is an object of this invention to also include the chemical/biological oxidation/reduction occurring before and after combustion in the combustion chamber of the wet combustion engine as well as in the intake and holding tanks, respectively. The burning utilizes enzymes produced by the microbes that subsequently act as organic catalysts.

2. P-I-D Stands for Proportional, Integral, Derivative (Relating to a Bioproactor).

Process control input variables can be continuously measured and directly fed into computer algorithms. Precise output adjustment calculated by the P-I-D algorithms improves the rise time (the "P" benefit with less time required to complete an effort), improves overshoot control (The "P-I" benefit reduces over-correction efforts with an additional reduction in time), and eliminates reaction steady-state errors (the "P-I-D" benefit analogous to successfully applying an intense effort at the last possible moment to have a best effort in the least amount of time). This input feedback-output control method is common and perfected throughout industry. Monitoring changes and pro-acting before the full impact is delivered vastly improves reaction potential and efficiency. This very mechanism when applied to anticipated needs gives the bioproactor a pre-emptive capability. For example, a rapid increase in carbon dioxide gas production is detected and analyzed, predicting a highly active microbe reaction is underway; this triggers a pre-emptive adjustment for pH before the reaction limit is reached. It is this anticipatory proactive control that makes a bioproactor an integral part of the wet combustion engine system. See the internet publication obtained on Jul. 23, 2002 from Carnegie Mellon and The University of Michigan titled: PID Tutorial.

3. bioreactor (referring to use of a vessel containing viable microbes) as: reaction vessel into which viable microbes are introduced and allowed to react.

4. proactive (referring to pre-emptive actions, e.g. acting in advance) as: dynamic ability to recognize, anticipate, rapidly adjust, and thereby sustain critical living conditions.

5 recycle process (referring to gas, liquid and solid/liquid process streams) separating undesirable from desirable matter and storing and reusing same 6 regenerative recycle process (RRP) (dealing with life-support factors) restoring and purifying matter to equal or greater quality.

7 proportional regenerative recycle process (PRRP) (life-support conditions) Fractional portion of the system is removed and simultaneously replaced by regenerative recycled or new matter.

8. bioproactor or bio-proactor (referring to a highly evolved bioreactor) as: a highly evolved bioreactor capable of proactive, pre-emptive life-support. By definition, a bioproactor actively makes beneficial adjustments in advance of critical life-threatening conditions. A bioproactor senses biologically pertinent changes in real-time, adjusts in anticipation of the consequences of those changes, or compensates in advance. The bioproactor can incorporate pre-emptive actions, such as proportional regeneration (concurrent recycling), real-time quantitative and qualitative analysis of biomass production, and pre-emptive adjustments from historical analysis of bio-sensing biological activity.

9 minomax (describes range limits where "o" is short for "optimum"), the optimum as a subset of minimum and maximum range limits wherein the optimum is a preferred but not a required range within the minimum and maximums.

10. exponential growth phase bacteria (or EGB) (one of four growth phases) bacteria multiplying at their maximum rate when adequate substrate and nutrient are supplied; temperature is the remaining limiting factor. (See: Waste Water Engineering, $4^{th}$ edition, Metcalf & Eddy, McGraw-Hill, ©2003, Pg 566-567)

11. life-support system (referring to living, multiplying organisms, e.g. microbes such as bacteria) system required to maintain an adequate supply of energy, carbon sources, organic or inorganic elements and nutrients, to support the surviving exponential growth phase bacteria [in the bioproactor]. (See: Waste Water Engineering, $4^{th}$ edition, Metcalf & Eddy, McGraw-Hill, ©2003, Pg 564).

12. bio-generation (an advanced bio-reactor producing exponential growth phase organisms) ability to produce large quantities of exponential growth phase bacteria in high concentrations on a regular basis. (e.g. 10 trillion/liter each 24 hrs).

13. advanced aeration (delivery of gases into solvents such as liquid water) ability to maintain dissolved gas levels into a bioproactor at a rate sufficient enough to support exponential growth microbes, (i.e., by a vacuum Bubble™ aeration). See Sewage Aeration Systems brochure.

14. microbial food equivalent, (at times referred to as MFE) fuel resulting from a waste refining process, treated, prepared and adjusted to produce a grade of fuel also considered a microbial food equivalent that is capable of being biologically burned.

15. PLC/integrated computer/computer (PLC is short for programmable logic controller) PLC is functionally equivalent to a computer. The term integrated is used herein to include feedback from input and output controls connected to a PLC, computer or a combined network of both.

16. Gas, liquid and solid/liquids, process stream has all three phases, each requiring a different recycling means. Traditional means and technology may be used for all: desirables are kept for reuse or for storage while undesirables are eliminated. Solid/liquid refers to practical means of treating solids in slurry form.

17. Discarded or eliminated. Commercially salvageable matter is sold. Disposal, removal or elimination of undesirables is understood to be in an environmentally safe manner. A further object of this invention is to safely complete molecular conversion of waste to a preferred form, most typically molecules containing carbon, to carbon dioxide.

PRIOR ART

This invention refers to the more traditional meaning of the word engine, building on an earlier 1963 description by CAMP. See Water and Its Impurities by Thomas R. Camp, Reinhold Publishing Corporation, 1963, Library of Congress card catalog Number 63-21623 Chapter 10, Pg 219-220. Originally derived from the root ingenious, its evolution from early use in 17th century to modern day, reveals a broad application of meaning and use. One range of examples encompasses passion, hardware and computer-science; the passionate engines of war, the steam engine, and an internet search-engine are three such examples. This invention best parallels the principles involved in and descriptions used for an internal combustion engine. An example follows.

A fuel is oxidized in and exhausted from a combustion chamber. A wet combustion engine system combines a bioproactor, a computerized control system, a specialized combustion chamber, ancillary nutritional support and a fuel delivery system. The fuel system provides an energy source from the breakdown of chemical compounds, thereby enabling respiration by bacteria. Camp describes . . . "wet combustion" . . . as . . . "oxidation of the chemical compounds . . . by the bacteria", (cited above).

A contrast and comparison of a wet combustion and of an internal combustion engine is as follows:

The Wet Combustion Engine Operates on the Principle of the Biological Oxidation of Liquid Phase Fuel.

Suitably prepare and condition a carbon source to function as fuel. Within a confinement chamber, provide all other essential parameters, as necessary for a BIOLOGICAL, LIQUID phase, exponential-growth reaction. Control subsequent reactions by repeatedly cycling or continuously feeding fuel into exponential growth oxidation reaction. Exhaust all undesirable products of combustion. Use resulting kinetic and potential energy.

The Internal Combustion Engine Operates on the Principle of the Chemical Oxidation of Gas Phase Fuel.

Suitably prepare and condition a carbon source to function as fuel. Within a confinement chamber, provide all other essential parameters as necessary for a CHEMICAL, GAS phase, exponential-growth reaction. Control subsequent reactions by repeatedly cycling or continuously feeding fuel into exponential growth oxidation reaction. Exhaust all undesirable products of combustion. Use resulting kinetic and potential energy.

The above, using a simple substitution for the process distinction from chemical to biological and for the reaction fuel phase from that of liquid to gas, demonstrates the similarity of the two engines. The wet combustion engine burns refined fuel in a liquid, most typically and including, but not limited to, water. Its reaction is slower; it is controlled combustion. The internal combustion engine burns refined fuel as a vapor; and the reaction is very fast; it is explosive combustion.

Just as the modern internal combustion engine's on-board computer processes real-time data from sensors and then implements various adjustments and controls to optimize engine, brake and transmission performance, the wet combustion engine uses bio-sensors and an integrated computer system to optimize and dynamically adjust the living conditions within the life-support system. Raw waste refinement in preparation of a microbial (i.e. bacterial) grade food equivalent is comparable to that of requiring higher-octane fuels for higher-performance automotive engines. By supplying an available waste stream, (processed and conditioning to bacterial grade food), and by controlling the remaining biological dependent variables necessary to maintain an exponential growth phase culture, the new reaction limits are a function of by-product removal and temperature control. This invention is possible because of the combined availability of a computerized control system, a concentrated supply of exponential growth microbes and an adequate supply of dissolved oxygen. This combination shifts the practical limits of the reaction from supply to that of by-product removal and temperature control.

The air supply, and more precisely the available oxygen content within the air, is one of the first dependent variables to limit either of the oxidation-reduction reactions. In operating an internal combustion engine, one "steps-on-the-gas" enabling increased air flow, which "pulls in" a corresponding supply of a metered fuel/air mixture. Any restriction to the air supply immediately modifies or stops (chokes) the oxidation reaction. The same principal is applied to the wet combustion engine. Recent advances in oxygen transfer efficiency for liquids, especially advanced aeration devices, have lessened the reaction limits of dissolved oxygen. Through additional dissolved oxygen replenishment during proportionate regeneration, the oxidation reaction can be controlled and regulated in the wet combustion engine.

A further limit to exponential growth is viability of the microbes and their natural attrition (death). An independent bio-generator, delivering exponential growth cultures to the life-support chamber (bioproactor) and then periodically or continuously re-inoculating said chamber as necessary, can rapidly adjust and restore a decline in microbe numbers. Recent advances in such bio-generation hardware have made this wet combustion engine practical. For example, U.S. Pat. No. 6,335,191 Kiplinger, et al., Jan. 1, 2002 and U.S. Pat. No. 6,402,941, Lucido, et al., Jun. 11, 2002 disclose the ability to deliver large numbers of microbes to the environment, which may be applied to this invention.

U.S. Pat. No. 5,928,514 Gothreaux issued Jul. 27, 1999, teaches the use of a bio-reactor in treating waste in combination with aeration for on board use by watercraft and mobile vessels. U.S. Pat. No. 5,585,266, Plitt et al., issued Dec. 17, 1996, describes an immobile cell bioreactor for culturing and harvesting cells. U.S. Pat. No. 5,833,857, Roth, issued Nov. 10, 1998, describes a mobile bioreactor and bio-generator used to treat waste. U.S. Pat. No. 5,725,770 Henry, issued Mar. 10, 1998, describes a waste treatment process with bioreactor in series to treat animal or human feces. U.S. Pat. No. 5,705,390, Kadouri, issued Jan. 6, 1998, shows a radial flow with culture medium and cell basket. These citations are those patents applicant has found to be of general interest to the subject of this invention while searching US classes 435 and 210.

Field investigation of the benefits of aeration devices using vacuum Bubble™ aeration demonstrated a significant oxygen transfer efficiency potential for large scale deployment. U.S. Pat. No. 6,245,237 Blough, issued Jun. 12, 2001 demonstrates the advantages of the oxygen sustaining performance of vacuum Bubble™ aeration in bacterial treatment for breaking down contaminants in water. See NASA's Space Alliance Technology Outreach Program (SATOP: Texas), Vol. 1, Issue 1, Premier 2002 January-March, Newsletter, Section: "Success Story" . . . describing aeration project.

SUMMARY OF THE INVENTION

This invention relates to

The system of biologically burning fuel in a liquid environment, such as water, that comprises: collecting raw waste in a container, separating non-combustibles, such as plastic trash, from bio-combustible components, to prepare a modified waste product; preparing the modified waste product by adjusting the quality and consistency to produce a suitable fuel mixture; conditioning said fuel to a microbial food equivalent mixture optimized for introduction into the surrounded combustion chamber; filling and maintaining an operating supply of the microbial food mixture in a reservoir for feeding a combustion chamber; preparing and sustaining a bioproactor, with exponential growth phase microbes, in contact with combustion chamber; monitoring, controlling, metering and cycling by means of an integrated computer system, delivering the prepared microbial food mixture into the combustion chamber at a rate to optimize the combustion cycle biological burning, and exhausting the residue from the combustion chamber after biological burning.

This system also relates to wet combustion engines which include an integrated computer control and sensing system, a confined chamber in contact with an internal combustion chamber, a means for replenishing and maintaining exponential growth phase microbes, a combustion chamber enclosure in diffusion contact with the life-support system, intake and exhaust ports, and with a membrane having diffusion and separation control.

This invention also relates to the bioproactor with its pre-emptive and proactive application of life-support. The integrated biosensor feedback, computer control and PID algorithms help provide an "anticipated behavior capability" when dispensing nutrients, recycling, regenerating and replenishing.

DETAILED DESCRIPTION OF THE INVENTION

This invention is useful on waste streams that are capable of being refined and prepared. One embodiment employs a vessel from 5 to 55 gallons for its bioproactor and a corresponding 1 to 10 gallons for its combustion chamber. A permeable or semi-permeable membrane acts as a separation and diffusion interface between the life-support and combustion chambers. Membrane configurations and surface area/combustion chamber volume ratios are readily determined by observations and specific practice by one skilled in the art. Each species of microbe will have its own minimum, optimum, and maximum (minomax, or min-o-max) parameters. For example, microbes such as bacteria, algae, yeast, etc. have different min-o-max parameters. The rates of reaction are directly proportional, to the active surface area of the combustion chamber, its diffusion separation membrane characteristics, and its permeability.

Traditional bioreactor applications have bioreactor effluent added to a waste stream or a waste stream added to the bioreactor itself. This invention uses a novel approach of first, adjusting the conditions of the waste stream to that of fuel (a microbial food equivalent), and second, injecting the fuel into the combustion chamber membrane within a favorable environment. Biologically compatibility between fuel and the environment of the life-support system is essential. This invention uses comprehensive controls such as those provided by PID control loops, which enables continuous monitoring of limiting factors. Some of the major life-support issues are; the delivery of a continuous replacement of exponential growth bacteria; the addition of nutrients; replacement of dissolved oxygen; a corresponding removal of accumulated toxic gas; removal of the dead bacteria (bug bodies), etc. and the addition of purified water. In accordance with this invention, comprehensive control is provided by using computer managed process control loops including but not limited to proportional-integral-derivative (PID) control loops. Resulting algorithms are able to make dynamic adjustment in real-time. See the internet publication obtained on Jul. 23, 2002 from Carnegie Mellon and The University of Michigan titled:

PID Tutorial, http://www.engin.umich.edu/group/ctm/PID/PID.html.

This invention directs fuel into the combustion chamber defined by the combustion chamber membrane enclosure, surrounded by a high-performance favorable environment within the bioproactor. An attached bio-generator, proportional regenerative recycle process, and advanced aeration aid the combustion; exhaust of the resulting by-products is directed to a holding tank. The wet combustion engine and the system employed optimize food to an enhanced state and promote more rapid reaction, in less time, with increased capacity by biological oxidation. Exponential growth bacteria consume oxygen and nutrients at an exponential rate. Without re-supply and detoxification, the "bug bodies" and waste generated by the combustion process would halt the metabolic processes. A further object of this wet combustion process is to refine and recycle waste matter from the life-support system and discharge holding tank, and return it back to the fuel system as compatible food and a reseed of surviving microbes. "Compatible" is defined as being, as close to the same basic biological and chemical properties to that of the bioproactor, as is practical. Some of the properties to adjust are pH, temperature, acceptable dissolved gas levels, conductivity, salinity, etc, which make the return as favorable and compatible to the receiving culture as is possible.

Unique applications such as those with micro-gravity or space deployment are applicable for this invention. For example, a closed system, with liquid and gas control, provides the delivery mechanism required for the combustion chamber.

By implementing life-support, computer monitoring and control, the remaining operating parameters are achieved.

The apparatus required to accomplish the above can be simple and small. In one example, a closed water tight ~15 gallon container containing a concentric column (formed by an open mesh structure ~1 gallon in capacity) is attached to the outlet valve built into the bottom of the 15 gallon container. This column in the center has a valve inlet at the top and an outlet at the bottom. A permeable or semi-permeable membrane, constructed from fiber mesh, such as nylon mesh, can be securely attached to the center column. The bioproactor is comprised of the entire contents of the 15 gallon container including the center mesh/nylon column.

Fuel is first prepared by processing raw-waste in order to separate the non-bio-combustibles such as plastic trash. This modified waste is further refined to a microbial food equivalent that is optimized for intake into the combustion chamber. This food is stored in a food reservoir connected to the top of the combustion chamber. After filling and inoculating the bioproactor, using treated water having its pH, dissolved oxygen, total suspended solids, total dissolved solids etc., optimized, the biosensors are calibrated and cycle times are set.

The intake cycle begins with filling the combustion chamber with the microbial food equivalent fuel. Bioproactor liquid contents (mother-liquor) present in the combustion chamber is displaced by the introduction of the microbial food equivalent. The bioproactor level may be adjusted to accommodate filling and diffusion rate. This initiates the diffusion process between the life-support chamber and combustion chamber. The computer implements the algorithmic controls to maintain the balance of the system parameters such as, gas analysis, temperature, pH, dissolved oxygen (DO), conductivity, total suspended solids (TSS), total dissolved solids (TDS), temperature, and pressure.

In the life-support chamber, the proportional regenerative replacement process takes place in the following manner. A portion of the total working water capacity of the life-support system is removed and restored to equal or greater quality, and returned. The flow rate and volumes are also controlled by the computerized monitoring system. Computer analysis adjusts the rates and volumes. For example, multi-variant analysis of a historical database is good method to aid in optimizing the operation. Complex systems can utilize networked PID control.

For proportional replacement in the bioproactor, constant replenishment of regenerated liquids such as water equals the amount removed. This optimized water is restored with nutrients, DO, buffered pH treatment and any other applicable additives, including pharmacology adjustments. This restoration treatment includes de-gassing, TSS removal, pH adjustment, and others mentioned above. This purified water is constantly providing and restoring additional storage space for oxygen dissolution. For example storage capacity for dissolved oxygen is greatly reduced when total suspended solids (TSS), biochemical oxygen demand (5 day BOD5 test) content are exceptionally high; in situations with the formation of emulsions; or during high levels of gases such as carbon dioxide.

Rates of reaction, visible reduction in waste, pH loadings and other indicators determine completed combustion. The exhaust cycle involves opening the discharge valve for a predetermined time. The discharge valve is closed and the intake cycle restarted. The subsequent intake fuel combines with the mother-liquor volume diffusing into the evacuated combustion chamber. The quantity diffusing into the chamber is a function of the permeability of the membrane and intake flow rate. Optionally, as the liquid level of the combustion chamber drops during the exhausting discharge, an internal scraping device removes any accumulations of internal bio-film buildup from the inside walls of the flexible diffusion separation membrane.

There are cases where partial treatment would be preferred. If detoxification, rather than complete waste combustion is an objective, the reaction could be limited or terminated early. This application would be classified as a partial biological burn. The partial combustion may be augmented by introducing additional enzymes to accelerate the decomposition, such as those known to decompose such wastes as fat, oil, grease, and sugar.

The collecting tank for the exhaust is treated as a traditional clarifier. Proven gas, liquid, and solid separation techniques are used to classify, separate and recycle results. Most of the settling of the dead microbes (bug bodies) takes place in this compartment. Filtration to recover high quality water as well as reverse osmosis may be applied.

The following sections outline the overall systems of this invention.
Section 1A outlines the regenerative recycle process.
Section 1B outlines the proportional regeneration variations.
Section 2 outlines and describes the waste stream process. This section shows the general process by which raw waste is converted to a microbial food equivalent.
Section 3 outlines the life-support process with proportional regeneration.
Section 4 describes the process of life support water handling from the beginning of the regeneration step to the return of conditioned water. This process is presented in greater detail to show the additional conditioning requirements.
Section 5 includes the main elements of the invention and a cycle process loop.

Section 1A: Regenerative Recycle Process (RRP); 1B it's Proportional Variations
1A: Process stream is regenerated by diversion and treatment as follows:
  a. Classify specific classification criteria applicable to this process (pertinent factors effecting this reactions)
    i. e.g. gases: by type, such as carbon dioxide, nitrogen, or methane
    ii. e.g. liquids: by properties or condition such as conductivity, pH, or membrane permeability
    iii. e.g. solids: by specific gravity, toxicity, % liquid
  b. Separate by pertinent separation criteria identified above such as liquid from solid separation or specific gravity, etc.
  c. Discard or Eliminate undesirable separations.
  d. Hold the remaining desirable separations until next processing step is continued
  e. Continue processing separated streams (i.e. gas, liquid or solid fractions)
  f. Apply Quality Control Test (QCT) for minomax range compliance
  g. Upon failure of QCT:
    i. Adjust quality for critical parameters such as temp, pH, dissolved oxygen, toxicity, salinity, etc.
    ii. Reapply QCT, repeating adjustments
  h. Upon passing QCT:
    i. Return to Process Stream after recycling and regeneration are complete as needed, or
    ii. Hold for long term Storage, then
    iii. Condition for storage; upon return from storage
    iv. Return to QCT (see [1.A.f] above)

1B: Proportional Regeneration as an Extension of Regenerative Process (PRRP)

A portion of the life-support system is removed for restoration and concurrently replaced. The restorative process removes undesirable by-products that are discarded or eliminated. The portion recycled and retuned is of equal or greater water quality and is biologically optimized. The quantification of the portion is dynamically determined by the bio-sensing, proven practice or a combination of both. Complex applications can be effectively controlled by Proportional Integral Derivative (PID) controls.

Section 2: Waste Stream Processing

Raw waste containing biologically insoluble items such as plastic, string, and other undesirable contents can hinder further processing. These items are physically removed by traditional means. The screened raw waste, now designated as, waste, is further processed to make it uniform in size and consistency using traditional treatments such as a grinder pump. It is preferred that particles are finely mixed or ground to expose the greatest surface area possible. The ground material is considered fuel when uniform consistency and quality is attained. After pre-treating to parameters closely matching the life support system, the fuel has been adjusted to a microbial food equivalent (MFE) grade fuel. This refinement matches such parameters as pH, salinity and toxicity to within limits microbes can withstand. The optimum, within the minomax, is the preferred target for MFE grade fuel.

The Raw Waste Stream Maybe Processed to a MFE Using the Following Procedure for Conversion;
Material to be processed is first analyzed:
  a. Classify (decide what is critical in this application)
    i. By size (e.g. selective screening for particle size)
    ii. By type (decide how to process e.g. spec gravity. floating/sinking)
    iii. By other criteria (color, consistency e.g. temp. modifications)
  b. Separate using criteria decided above. (e.g. decant grease from surface)
  c. Pre-treat
    i. Physically: e.g. screen/grind if required for uniform particles
    ii. Chemically e.g. change pH, hardness, nitrate concentration
    iii. Biologically e.g. pre-treat by partial combustion, or with enzymes
  d. Adjust water concentration e.g. add or remove water to achieve the % solids desired
  e. Storage mode
    iv. Long term
      1. Stabilize e.g. add products to limit undesirable degradation
      2. Condition e.g. add enzymes to break up solids
    Short term e.g. adjust temperature to assist processing
  f. After storage, Test/Adjust water concentration e.g. correct percent solids, +−water
  g. Quality Control Testing e.g. (is it biologically compatible & optimized?)
    i. Re-adjust (fail), proceed to step 2.d above
    ii. Ready for transfer (pass) to Combustion Chamber
  h. Food (fuel) reservoir
  i. Processed raw waste material now ready for Combustion Chamber Section 3: Life-Support System's Process and Regeneration The life-support system supports the entire biomass and is relevant to the successful operation of the wet combustion engine. Three key elements must be monitored and maintained. Fuel, heat and oxygen (e.g. for most common aerobic systems) must be present for combustion. Man's body temperature is 98.6 F. A burning match reaches 1000+F. The wet combustion engine temperature range is normally 80-130 F; its lower limit is −32 F (liquid phase) and its upper liquid limit has recently been redefined by the discovery of the symbiotic biological and chemical environments in high pressure, high temperature undersea volcanic vents. Other extremes include high acid and alkaline environments. The exploration of the diversity of biological activity is just beginning; and the wet combustion engine has the potential to operate at all of these extremes.

Life-support is accomplished by regenerating the quality of the liquid used, such as water. (See details on Section 1 RRP & PRRP describing proportional regeneration and recycling). By-products of combustion must be removed; nutrient, food and electron donor supply (most often oxygen) and minimum living conditions must be maintained. Although the minomax ranges vary from species to species, a general treatment process is outlined below. There are only three dispositions for the recycled gas, liquid, or solid: reuse; storage; or elimination. Bioproactor mother-liquor is proportionately (0-100%) conditioned and recycled to maintain biomass life-support for normal and extreme operation. The liquid, typically water, is treated as follows: (the simplistic examples given are by no means comprehensive or inclusive).

The general process of conditioning and recycling the gases, liquid and solids within the life support chamber may be achieved by the following treatment:
- 3.1 Classify determine required/desired parameters e.g. temp, pH, DO
- 3.2 Separate solids by settling, centrifuge, membranes etc.
- 3.3 Distribute to various material handling units as required/desired
- 3.4 Direct return e.g. if already pure enough
- 3.5 Purify e.g. by removing undesirables—methane, ammonia
- 3.6 Treat e.g. by chemical, physical or biological means—chlorinate
- 3.7 De-gas, e.g. remove carbon dioxide using membrane technology
- 3.8 Dilute e.g. by storage reserves from recycled process surplus
- 3.9 Adjust concentration (e.g. treat adding/removing purified liquid)
- 3.10 Test
  Upon failure loop up to [3.9] above
  Pass; proceed below
- 3.11 Storage reservoir—Hold, then prepare for use
  - 3.11.1 Retest (3.10 as above)
  - 3.11.2 Adjust (3.9 as above)
  - 3.11.3 Pass, proceed to step below
- 3.12 Return to Life-support Chamber Section 4: Life-Support Water Handling Liquid recycling and regeneration is fundamental to the conservative use of liquids within the wet combustion engine. Traditional monitoring techniques are used to provide biofeedback to the integrated computer system. In a closed system (see closed loop below), gas production may be used as an indirect measure of combustion rates and an indirect measure of cell activity. Biosensors are located in three levels below the liquid: bottom, middle, and top. A fourth biosensor is in the gas area above the liquid. A similar set of four biosensors may be located within the combustion chamber. These biosensors, in combination with traditional sensors and other instrumentation, measure and adjust for out of range minomax conditions. The liquid within the life-support system is literally the life-blood of the wet combustion engine. When operating, the engine is alive. By wet combustion, waste matter is reduced to less complex molecular structures. The system is moving food down the food chain taking it from complex to simple, e.g. sugar to carbon dioxide.

Life-support material Handling begins with the classification of the water and its contents. Separation of solids allows removed organics to be recycled, and removed inorganics and trash to be removed. Separated gases are analyzed, separated, collected, stored and/or released as needed. Liquids separated from solids can be either purified with means including but not limited to reverse osmosis, returned directly back to the process (e.g. as a raw waste component), or treated by means such as but not limited to degassing to remove undesirable gases (e.g. carbon dioxide, nitrogen, methane etc). Testing, treatment, and retesting to assure quality within desired limits enables immediate use or transfer to storage. Said treatment may require actions such as dilution by pure water; other adjustments may be necessary (e.g. temperature, total Suspended Solids (TSS), biological oxygen demand (BOO), nitrates, nitrates, pH, total dissolved Solids (TDS), chemical oxygen demand (COD), conductivity, salinity, turbidity, phosphates, ammonia etc). Other treatments or additives may be desired such as ultra violet light, sunlight and/or pharmacological treatments (e.g. vitamins).

In a closed system, mass balance control and monitoring provide additional means of measurement and hence control. (e.g. gas pressure may indirectly reflect biological activity).

Section 5: Description of Main Elements and Cycle Process Loop

A general overview of the essential elements at work in this system are listed here for reference.

A Bioproactor's System Elements Include:
- 5.1 Liquid (water and oxygen) added to purify and to sustain life forms
- 5.2 Life forms (microbes) added to sustain exponential reaction rates
- 5.3 Fuel (waste) prepared and supplied to maintain the reaction
- 5.4 PLC input and output (I/O) to adjust & control reactions
- 5.5 Bio-sensors monitor conditions
- 5.6 Control loops to integrate all operations The wet combustion engine operates with three basic actions; Intake, Combustion, and Exhaust. AU three cycles actually occur in the same place, the combustion chamber, but at different cycle times. The Intake cycle fills the combustion chamber with fuel; the Combustion cycle begins spontaneously with the life-support liquid supplying aggressive microbes. The release of energy within each cell's mitochondria can result in an exothermic release of escaping energy, the chemical combination of carbon compounds and other new molecules are being created. See: reference to the exergonic reactions cited by Waste Water Engineering, 4$^{th}$ edition, Metcalf & Eddy, McGraw-Hill, ©2003, Pg 574. The Exhaust cycle empties the products of combustion into a holding tank for further treatment and recycling. The Wet Combustion Engine Cycles of Intake, Combustion, and Exhaust are repeated with the products of combustion held and distributed for further processing.

Figure 1:
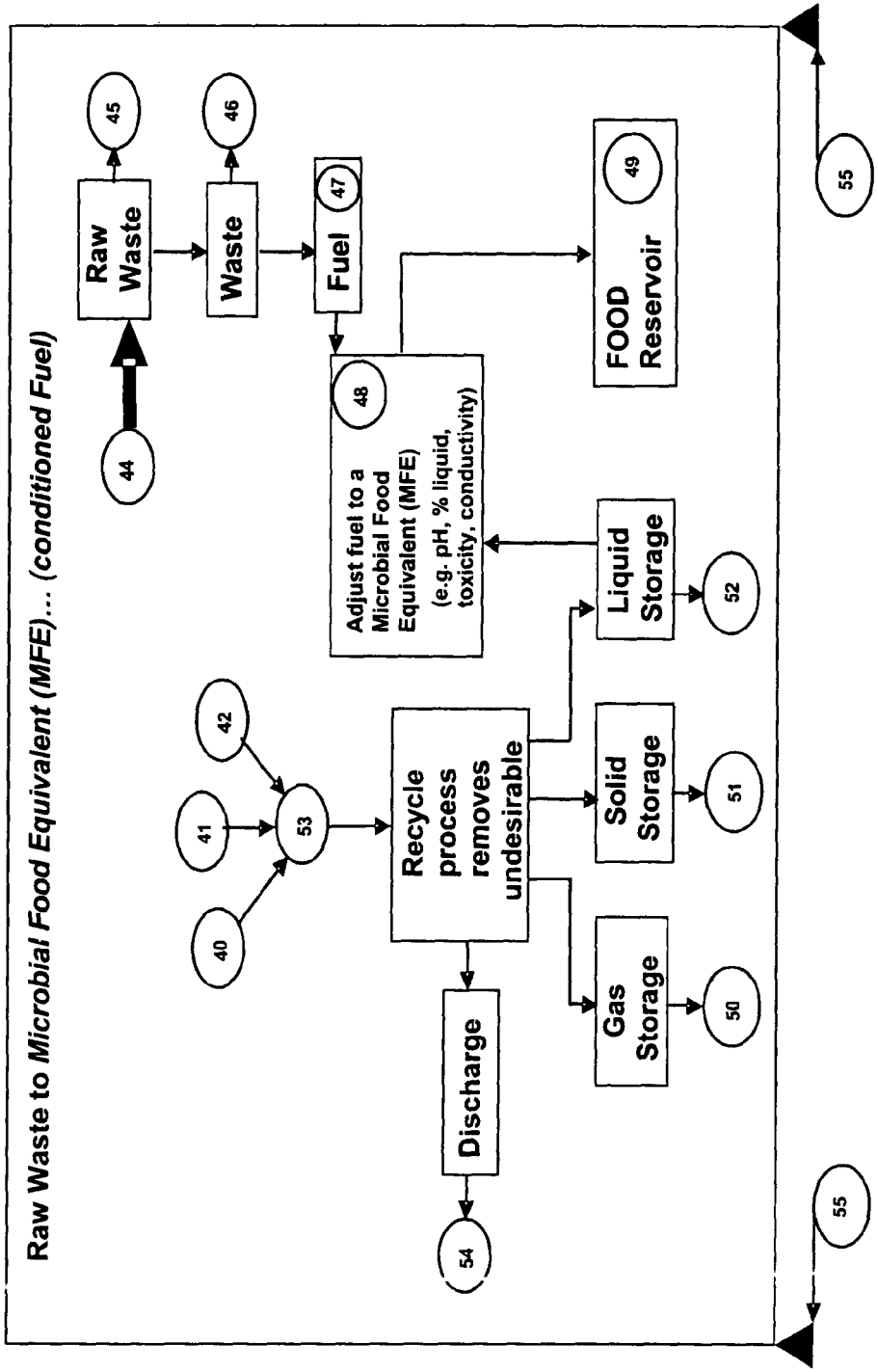
FIG. 1 is a flow sheet diagram showing the conversion of raw waste to microbial food equivalent or conditioned fuel. The legend for FIG. 1 is as follows:
- 40 Return of recycled Regenerative Recycle—gas
- 41 Return of recycled Regenerative Recycle—liquid
- 42 Return of recycled Regenerative Recycle—solid/liquid
- 44 Raw waste to be treated
- 45 Non-bio-combustible matter discarded from raw waste as trash (e.g. plastic, string)

46 Discard resulting from further refinement removing additional undesirables
47 Waste processed to adjust the uniformity, consistency, compatibility and quality, yielding fuel
48 Adjusted fuel serving as food and acclimated to optimum conditions in the life-support chamber
49 Microbial equivalent FOOD functions as compatible energy source for the specific microbes used
50 Storage of surplus reserve of recycled gas
51 Storage of surplus reserve of recycled solids/liquids
52 Storage of surplus reserve of recycled liquid
53 Recycle inlet from other sources such as bioproactor solid, liquid or solid/liquid
54 Discharge of undesirable gas, liquid or solids
55 Mass balance—weigh scale/volume or combination thereof.

Figure 2:
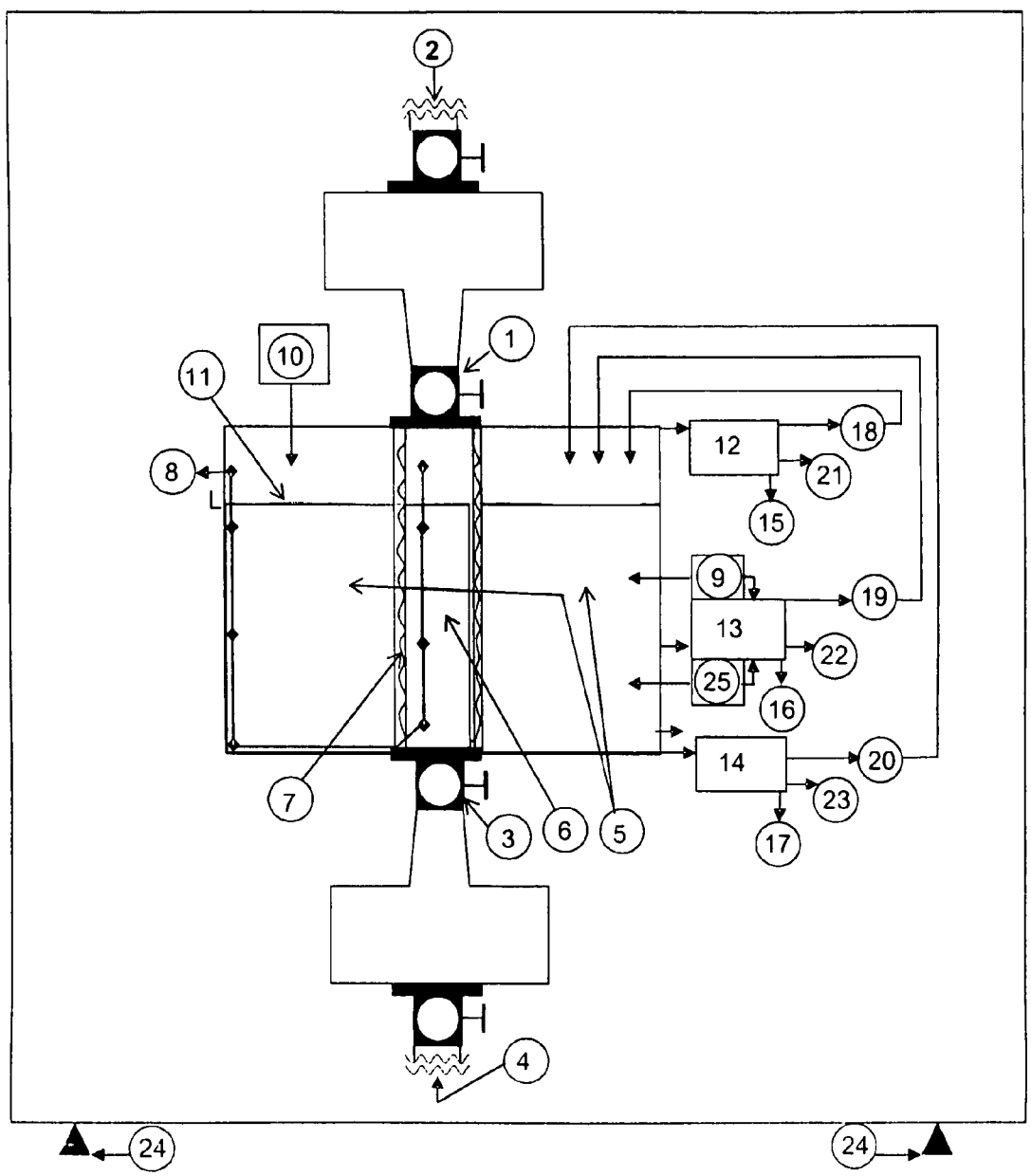

FIG. 2 is a cross section through the wet combustion engine in accordance with this invention. The legend for FIG. 2 is as follows:
1 Intake valve
2 Intake fuel feed inlet
3 Exhaust discharge valve
4 Exhaust feed outlet
5 Life-support chamber (bioproactor)
6 Combustion chamber
7 Diffusion separation membrane
8 Bio-sensors
9 Advanced aeration device feeds for 5 and 13 (PRRP—liquid)
10 Bio-generation device
11 Level in combustion chamber
12 Proportional Regenerative Recycle Process gas
13 Proportional Regenerative Recycle Process liquid
14 Proportional Regenerative Recycle Process solid/liquid
15 Undesirable portion—gas regeneration/recycle process
16 Undesirable portion—liquid regeneration/recycle process
17 Undesirable portion—solid regeneration/recycle process
18 Recycled gas recycled for return to process
19 Recycled liquid recycled for return to process
20 Recycled solid/Liquid recycled for return to process
21 Storage for excess gas recycled
22 Storage for excess liquid recycled
23 Storage for excess solid/liquid recycled
24 Mass balance weigh-scale, volume or combination thereof.
25 Nutrient source feeds for 5 and 13 (PRRP—liquid)

FIG. 3 is a cross section with legend of the combustion exhaust holding tank. The legend for FIG. 3 is as follows:
26 Exhaust feed from combustion chamber
27 Holding Tank inlet valve
28 Holding Tank for combustion exhaust
29 Liquid Level
30 Bio-sensors (liquid bottom-middle-top, gas at top)
31 Regenerative recycle Process—gas
32 Regenerative recycle Process—liquid
33 Regenerative recycle Process—solid/liquid
34 Discharge from Regenerative recycle Process—gas
35 Discharge from Regenerative recycle Process—liquid
36 Discharge from Regenerative recycle Process—solid/liquid
37 Storage for excess recycled Regenerative Recycle Process—gas
38 Storage for excess recycled Regenerative Recycle Process—liquid
39 Storage for excess recycled Regenerative Recycle Process—solid/liquid
40 Return of recycled Proportional Regenerative Process—gas
41 Return of recycled Proportional Regenerative Process—liquid
42 Return of recycled Proportional Regenerative Process—solid/liquid
43 Mass balance weigh-scale, volume or combination thereof.

DETAILED DESCRIPTION OF THE FIGURES

Referring to the FIG. 1, Fuel Conversion section of the drawing: The wet combustion engine system can be described as having three stages; fuel refinement, combustion and exhaust. Raw waste is introduced to the process through the process inlet (44) and is converted into waste by removing non-bio-degradables. Trash, such as plastic and string, is collected and removed (45). Further removal of undesirables (46) produces fuel (47). Adjustment of fuel (48) to the grade of microbial food equivalent (MFE) completes the refining process and the MFE fuel is stored (49). Gases (40), liquids (41) and solid/liquids (42) returning from other process areas are mated to their respective inlet (53). Each phase has its own unique recycle processes, however for descriptive purposes, they are treated herein collectively. Additional undesirables (54) result from further purification by methods such as separation and filtration. Surplus gases (50), liquids (51) and solid/liquids (52) are stored. All three stages of the wet combustion engine system can be optioned to operate on a mass balance basis, by either volume or weight (55). For example, accurate real-time weighing of systems inputs and outputs enables a mass-balance analysis by the computer to determine actual process performance.

Referring to the FIG. 2, Cross section through a wet combustion engine; the basic operation of a wet combustion engine requires at least three steps or cycles; intake, combustion and exhaust. Intake fuel feed inlet (2) supplies fuel (microbial equivalent food or MFE) from a reservoir in preparation for the intake cycle. The intake valve (1) opens to allow a charge of fuel into the combustion chamber (6). The diffusion separation membrane (7) surrounded by the life-support chamber (5) of the bioproactor, allows diffusion transfer to and from the combustion chamber. Biosensors (8) are located in strategic areas such as bottom, middle and top of liquid areas and at any convenient place in the gas phase areas. Sensors are typically in the life-support area (bioproactor) and optionally within the combustion chamber itself. Advanced aeration (9) and nutrient application (25) may be independently applied directly into the mother-liquor of the bioproactor, incorporated into the proportional regenerative recycling process liquid (13), or any combination thereof. Liquid removed from the middle level of the bioproactor is collected, recycled and sent through the proportional regenerative recycling process for liquids (13) to eliminate undesirables (16), store excess desirables (22) or recycle desired liquids back to the process (19).

The liquid level (11) can vary; however, the space above the liquid level enables collection, recycling and the proportional regenerative recycling process for gases (12) to eliminate undesirables (15), store excess desirables (21) or recycle desired gases back to the process (18). In this illustration, the solids settle at the bottom. This enables collection, recycling and the proportional regenerative recycling process for solids (14) to eliminate undesirables (17), store excess desirables (23) or recycle desired gases back to the process (20).

The introduction of exponential growth phase microbes by bio-generation (10) restores any decline in numbers and maintains over-all performance by regular replacement. This optimizes the wet combustion of the fuel in the combustion chamber. Combustion is a function primarily of the microbial metabolic rate and secondarily of the non-living chemical oxidation/reduction of other matter.

The exhaust cycle begins with the discharge of the combustion chamber following combustion removing the microbes and any of their by-products through the exhaust discharge outlet valve (3). The exhaust feed outlet (4) directs contents away from the engine. Refined process material balance (24) methodology (weight or volume) may be applied for enhanced process control. Not shown are the computer controls and PID loops. The integration and operation of said hardware and software has no specific layout requirements. The computer system simply reads inputs, completes analysis, employs applicable algorithms and outputs control measures.

Referring to the FIG. 3, Combustion Exhaust Holding Tank; the products of combustion are directed to the inlet (26) of holding tank for combustion exhaust (28). The inlet valve (27) allows filling to any required liquid level (29). Biosensor feed-back (30) at bottom, middle, top of the liquid and within the gas area, provide the computer and PID controls (not shown) to monitor and control subsequent exhaust activity. The recycling of gas (31), liquid (32) and solid/liquid (33) is handled by each discrete regenerative recycle processor, with each having a discharge (34), (35), (36); a storage (37), (38), (39) and a return to process (40), (41), (42) means. This exhaust holding tank allows further completion of combustion initiated and continuing beyond the combustion chamber. As stated before, any of the three stages of the wet combustion engine system can be optioned to operate on a mass balance basis, by either volume or weight (43), or a combination thereof.

Among the living organisms included within this invention are microbes, such as single or multi-celled microbes that are capable of living and reproducing after receiving carbon for cell synthesis; energy from photosynthesis or chemical oxidation/reduction; and other essential life-support nutrients. This would embrace all organisms capable of living in a liquid medium that can provide and sustain the life-force mechanism of the wet combustion system and perform a beneficial and desirable waste oxidation/reduction. Thus all temperature ranges represented by psychrophilic, mesophilic, thermophilic bacteria as well as multi-celled organisms such as phytoplankton, and zooplankton are also included. Thus various aquatic bacteria, archaea and eukarya may also be selected. Aquatic insects and larva are also capable of said beneficial oxidation/reduction.

Fuel is anything capable of contributing to the preparation of a microbial equivalent food. Therefore fuels would also include organics, inorganics, and hydrocarbons, as well as combinations of single and multi-celled microbes themselves; organisms living, dead or altered by chemical means such as enzyme treatment or by physical means such as macerating and grinding. Improved fuel consumption, in some cases, maybe enhanced by stimulating or accommodating bio-film production and by enzyme addition. Other fuel adjustments, conditioning and treatments include but are not limited to techniques such as ultra sound, magnetic field treatment, electromagnetic radiation such as ultra-violet light, laser, microwave bombardment or nuclear radiation. Genetically engineered microbes, altered to be better adapted, survive or flourish in the bioproactor are to be included as well as the above mentioned fuel adjustments and conditioning.

The separation diffusion membrane provides selective diffusion control to enable the life forms to oxidize/reduce fuels conditioned into microbial food. The type of membrane used determines the distribution and transfer potentials. These potentials determine the performance ranges of transfer of food and nutrient to and from the living organism, single or multi-celled. Flexible or rigid membranes which satisfy the system's selective diffusion exchange requirements can be used. The membrane's composition, through-put, control of its through-put and corresponding methodology may vary considerably. Natural or synthetic, the membrane material provides simultaneous fuel containment and life-support media exchange. Simple material composition examples include nylon mesh, or filter media. More complex compositions addressing liquid quality parameters include such membrane compositions as those used in reverse osmosis and such ion exchange resins often used in conjunction with reverse osmosis.

Pressure and vacuum adjustments to the bioproactor also control diffusion and transfer rates. Minomax calculations are determined for fuel and membrane combinations. Fuel injection and subsequent optimum wet combustion minomax ranges are targeted by selecting continuous feed, pulsed feed or any combination thereof. Quiescent bioproactor deployment, where mixing and movement of bioproactor contents are minimized, is another effective option. These treatments optimize the interdependent life-force mechanism of the wet combustion engine, wet combustion rate and effectiveness. Careful management and adjustment of the microbial ecosystem is the key to the wet combustion engine and bioproactor technology.

Although this invention has been described using specific charts, drawings, figures and examples, and certain specific embodiments have been described in detail in order to facilitate an understanding of this invention, I do not intend that this invention be limited in scope except as expressly defined in the appended claims.

The invention claimed is:

1. A process for biologically burning fuel in an environment which comprises three steps, an intake cycle, a combustion cycle and an exhaust cycle:

the intake cycle comprising collecting raw waste in a container, separating non-combustibles, from bio-combustible components, to prepare a modified waste product; preparing the modified waste product by adjusting the quality and consistency by separating non-combustible from bio-combustible components to produce a suitable fuel mixture; conditioning said fuel to a microbial food equivalent that is optimized for intake into a combustion chamber by employing P-I-D, (Proportional, Integral, Derivative), the combustion cycle comprising maintaining the microbial food equivalent in a reservoir for delivery to the combustion chamber with a separation diffusion membrane equipped with intake and exhaust valves; replenishing and sustaining a life-support chamber of a bioproactor for exponential growth microbes in contact with the combustion chamber, employing P-I-D monitoring and conditioning to maintain balance of the process parameters, said bioproactor, combustion chamber, separation diffusion membrane, and intake and exhaust valves structurally co-operating with one another by the bioproactor being positioned to define the combustion chamber having an intake and exhaust end and a separate adjacent life support chamber within said bioproactor, the exhaust cycle comprising metering and delivering the prepared microbial food equivalent into the combustion chamber at a rate monitored by P-I-D to optimize the combustion biological burning, and exhausting residue from the combustion chamber.

2. The process of claim 1 wherein the P-I-D uses bio-sensor feed-back to monitor, adjust, and condition the quality and quantity of gases, liquids and solids.

3. The process of claim 1 wherein exhausted residue from the combustion chamber is processed by holding, classifying, separating, conditioning, recycling, or discharging.

4. The process of claim 1 wherein intake, combustion, and exhaust are repeated in sequence as cycles.

5. The process of claim 1 wherein the biological burning is stopped prior to complete combustion.

6. The process of claim 1 wherein the microbes are bacteria.

7. The process of claim 1 wherein the bioproactor supports photosynthesis.

8. The process of claim 1 wherein the P-I-D monitoring of parts or all of the intake, combustion and exhaust processes uses mass balance control by weight, volume or a combination thereof.

9. The process of claim 1 wherein sustaining the bioproactor wherein the process is operated at high temperature and high pressure similar to those conditions found in undersea volcanic vents with accompanying symbiotic biological and chemical reactions.

10. The process of claim 1 wherein the bioproactor is operated as a single unit, as a plurality of units in series, in parallel or any combination thereof.

11. The process of claim 1 wherein the contents of the bioproactor are mixed, stirred or agitated.

12. The process in claim 1 wherein the cycles are operated continuously by a positive displacement stream.

13. The process of claim 1 wherein the bioproactor operates quiescently thereby minimizing internal mixing and agitation.

14. The process of claim 1 wherein the bioproactor promotes the growth and beneficial symbiotic effect of bio-film formation.

\* \* \* \* \*